United States Patent
Rimai et al.

(10) Patent No.: US 12,275,282 B2
(45) Date of Patent: Apr. 15, 2025

(54) NON-PNEUMATIC TIRE HAVING LOOPED SUPPORT STRUCTURE AND METHOD OF MAKING SAME

(71) Applicant: Bridgestone Americas Tire Operations, LLC, Nashville, TN (US)

(72) Inventors: Benjamin E. Rimai, Copley, OH (US); Nicholas J. Harp, Massillon, OH (US); Christopher W. Burton, Stow, OH (US); Andrew V. Haidet, Silver Lake, OH (US); Brandon P. Nelson, Stow, OH (US); Timothy M. Lusk, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 588 days.

(21) Appl. No.: 17/640,408

(22) PCT Filed: Aug. 25, 2020

(86) PCT No.: PCT/US2020/047782
§ 371 (c)(1),
(2) Date: Mar. 4, 2022

(87) PCT Pub. No.: WO2021/061323
PCT Pub. Date: Apr. 1, 2021

(65) Prior Publication Data
US 2022/0324253 A1 Oct. 13, 2022

Related U.S. Application Data (60) Provisional application No. 62/904,891, filed on Sep. 24, 2019.

(51) Int. Cl.
*B60C 7/14* (2006.01)
*B29D 30/02* (2006.01)
*B60C 7/10* (2006.01)

(52) U.S. Cl.
CPC .............. *B60C 7/146* (2021.08); *B29D 30/02* (2013.01); *B60C 7/107* (2021.08); *B60B 2360/30* (2013.01)

(58) Field of Classification Search
CPC ........... B60C 7/107; B60C 7/146; B60C 7/18; B29D 30/02
See application file for complete search history.

(56) References Cited

U.S. PATENT DOCUMENTS

2004/0069385 A1* 4/2004 Timoney ................... B60B 9/26
152/69
2010/0260967 A1* 10/2010 Delfino ..................... B32B 5/12
428/113

(Continued)

FOREIGN PATENT DOCUMENTS

CN 106114066 A * 11/2016
CN 205768329 U 12/2016

(Continued)

OTHER PUBLICATIONS

International Search Report & Written Opinion; Corresponding PCT Application No. PCT/US2020/047782; Authorized Officer Bahng Seung Hoon; Nov. 11, 2020.

(Continued)

*Primary Examiner* — Kip T Kotter
(74) *Attorney, Agent, or Firm* — Shaun J. Fox; Bryan J. Jaketic (57) ABSTRACT

A non-pneumatic tire includes an inner ring, an outer ring, and a plurality of loops extending between the inner ring and the outer ring. The plurality of loops including at least a first loop and a second loop, wherein the first loop and the second loop are each in direct contact with both the inner ring and the outer ring. The first loop has a single reinforcement layer disposed therein, and includes a first extent that extends between the inner ring and the outer ring and a second extent (Continued)

that extends between the inner ring and the outer ring. The second loop has a single reinforcement layer disposed therein, and includes a third extent that extends between the inner ring and the outer ring and a fourth extent that extends between the inner ring and the outer ring. The second extent is in direct contact with the third extent.

19 Claims, 11 Drawing Sheets

(56) References Cited

U.S. PATENT DOCUMENTS

| | | | |
|---|---|---|---|
| 2013/0263985 A1 | 10/2013 | Alshdaifat et al. | |
| 2017/0008342 A1 | 1/2017 | Martin et al. | |
| 2017/0368775 A1 | 12/2017 | Thompson | |
| 2018/0354316 A1* | 12/2018 | Celik | B60C 7/18 |
| 2021/0061010 A1* | 3/2021 | Van Riper | B60C 7/14 |
| 2021/0229498 A1* | 7/2021 | Wang | B60C 7/10 |

FOREIGN PATENT DOCUMENTS

| | | | |
|---|---|---|---|
| CN | 108430795 A | 8/2018 | |
| CN | 208053000 U | 11/2018 | |
| JP | 2009269410 | 11/2009 | |
| JP | 2016113106 | 6/2016 | |
| JP | 2021000752 A | 1/2021 | |
| KR | 10-2013-0056788 | 5/2013 | |
| KR | 10-2018-0025748 | 3/2018 | |
| WO | WO-9605917 A1 * | 2/1996 | B60C 7/102 |
| WO | 2009005945 | 1/2009 | |
| WO | WO-2017005105 A1 * | 1/2017 | B60B 21/00 |
| WO | WO-2019074834 A1 * | 4/2019 | B29D 30/02 |

OTHER PUBLICATIONS

Supplementary European Search Report; Corresponding EP Application No. 20867874; Sep. 7, 2023.

* cited by examiner

NON-PNEUMATIC TIRE HAVING LOOPED SUPPORT STRUCTURE AND METHOD OF MAKING SAME

FIELD OF INVENTION

The present disclosure relates to a non-pneumatic tire having loop-shaped support structure and a method of making the same. More particularly, the present disclosure relates to a non-pneumatic tire having loop-shaped spokes or webbing and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

SUMMARY OF THE INVENTION

In one embodiment, a non-pneumatic tire includes an inner ring having a first diameter and an outer ring having a second diameter greater than the first diameter. The outer ring is substantially coaxial with the inner ring. The tire further includes support structure extending between the inner ring and the outer ring. The support structure includes a plurality of loops extending laterally from a first side of the non-pneumatic tire to second side of the non-pneumatic tire. Each of the plurality of loops defines an opening that is visible from the first side of the non-pneumatic tire. Each of the plurality of loops is in direct contact with both the inner ring and the outer ring. The plurality of loops includes at least a first loop and a second loop, the first loop being in direct contact with the second loop. The tire also includes a plurality of fillets disposed between the inner ring and the outer ring. The plurality of fillets includes at least a first fillet and a second fillet. The first fillet is in direct contact with the inner ring, the first loop, and the second loop. The second fillet is in direct contact with the outer ring, the first loop, and the second loop.

In another embodiment, a method of making a non-pneumatic tire includes the steps of providing an inner ring of elastomeric material, providing an outer ring of elastomeric material, and arranging the inner ring and the outer ring such that the inner ring is substantially coaxial with the outer ring. The method further includes providing a ribbon of reinforced elastomeric material, providing a plurality of cores, and spirally winding the ribbon of reinforced elastomeric material about each of the plurality of cores. The method also includes arranging the plurality of cores between the inner ring and the outer ring, and curing the inner ring, the outer ring, and the ribbon disposed about the plurality of cores.

In yet another embodiment, a non-pneumatic tire includes an inner ring, an outer ring, and a plurality of loops extending between the inner ring and the outer ring. The plurality of loops including at least a first loop and a second loop, wherein the first loop and the second loop are each in direct contact with both the inner ring and the outer ring. The first loop has a single reinforcement layer disposed therein, and includes a first extent that extends between the inner ring and the outer ring and a second extent that extends between the inner ring and the outer ring. The second loop has a single reinforcement layer disposed therein, and includes a third extent that extends between the inner ring and the outer ring and a fourth extent that extends between the inner ring and the outer ring. The second extent is in direct contact with the third extent.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
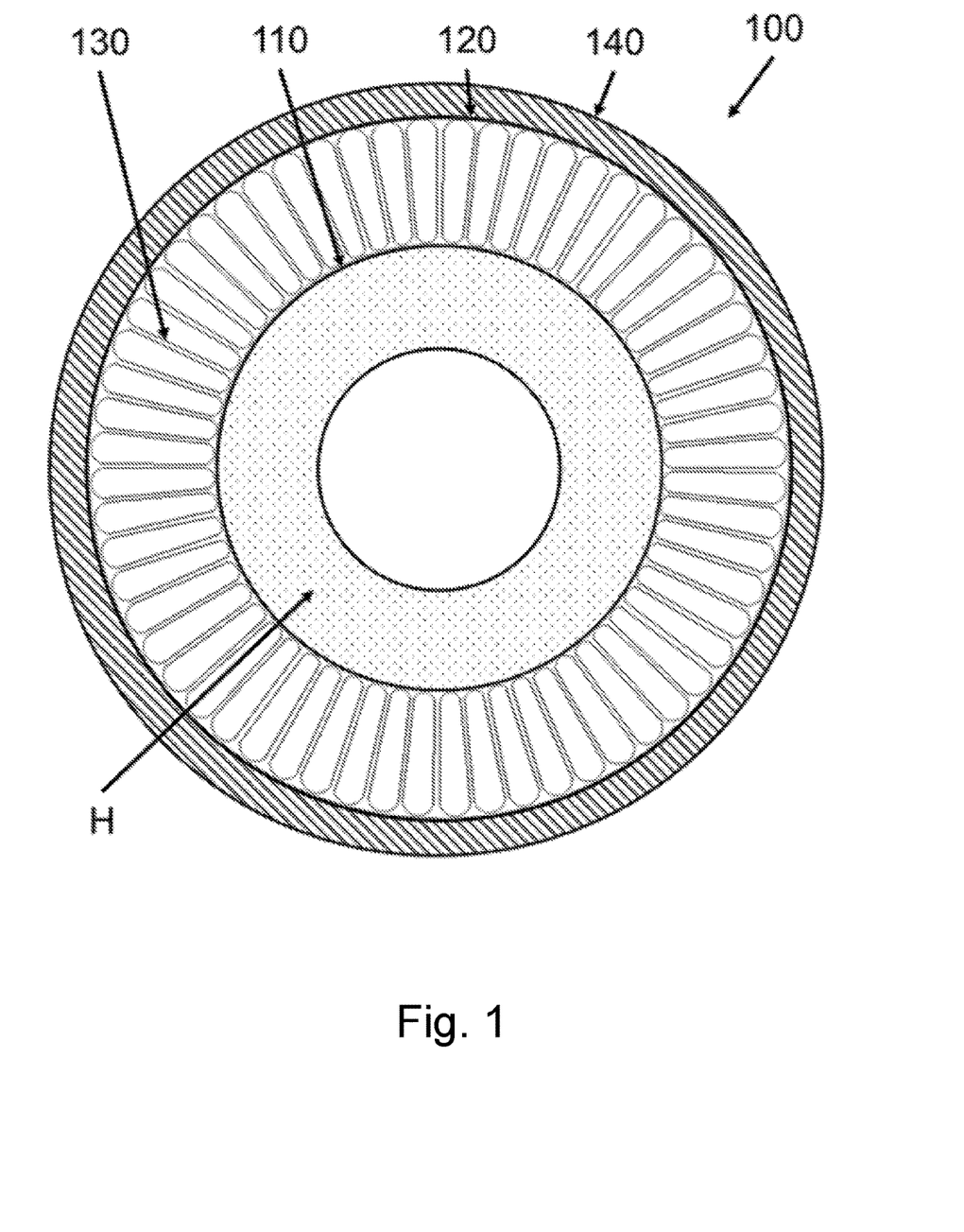
FIG. 1 is a front view of one embodiment of a non-pneumatic tire.

FIG. 1 is a front view of one embodiment of a non-pneumatic tire 100. The non-pneumatic tire 100 includes an inner ring 110 having a first diameter, and an outer ring 120 having a second diameter greater than the first diameter. The outer ring 120 is substantially coaxial with the inner ring 110. In the illustrated embodiment, the inner ring 110 is shown as being attached to a hub H. A plurality of spokes 130 extend between the inner ring 110 and the outer ring 120. In an alternative embodiment, a webbing or other support structure may be employed instead of spokes.

A circumferential tread 140 is disposed about the outer ring 120 in the illustrated embodiment. The tread 140 may include tread elements such as grooves, ribs, blocks, lugs, sipes, studs, and other elements. A shear band or other shear element or reinforcement structure (not shown) may be disposed between the outer ring 120 and the tread 140. In an alternative embodiment (not shown), the separate tread may be omitted and instead tread elements may be formed directly on the outer ring.

Figure 2:
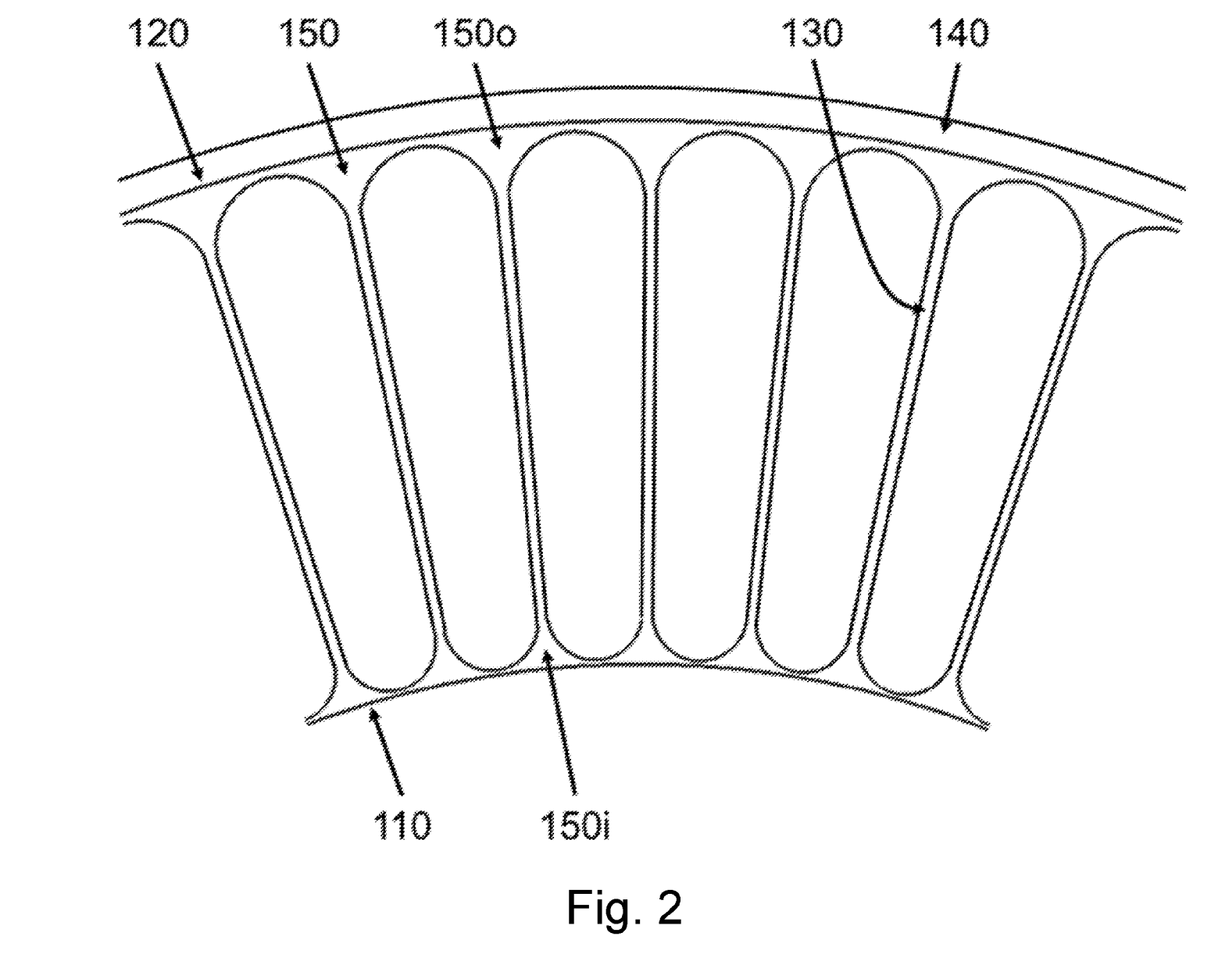
FIG. 2 is an enlarged partial front view of the non-pneumatic tire of FIG. 1.

FIG. 2 is an enlarged partial front view of the non-pneumatic tire of FIG. 1. As can be seen in this view, the spokes 130 are formed by a plurality of loops disposed in a series circumferentially about the tire. Each of the individual loops extends laterally from a first side of the non-pneumatic tire 100 to second side of the non-pneumatic tire 100. Each of the plurality of loops defines an opening that is visible from the first side of the tire.

In the illustrated embodiment, each of the plurality of loops is in direct contact with both the inner ring 110 and the outer ring 120. A plurality of fillets 150 are also disposed between the inner ring 110 and the outer ring 120. The plurality of fillets 150 includes inner fillets 150i and outer fillets 150o. The inner fillets 150i are in direct contact with the inner ring 110, and both a first loop and a second loop in each adjacent pair of loops. The outer fillets 150o are in direct contact with the outer ring 120, and both the first loop and second loop in each adjacent pair of loops.

The inner and outer rings 110, 120 may be constructed of a polymeric material, such as natural or synthetic rubber, other elastomeric material. Alternatively, the inner and outer rings 110, 120 may be constructed of a harder polymeric material such as polyurethane, polyester, nylon and polyvinyl chloride (PVC). The spokes 130 are formed of loops constructed of elastomeric material having a single layer of reinforcement disposed therein. The loops may be constructed from a sheet of elastomeric material, or from a spiraled ribbon of elastomeric material having a single layer of reinforcement disposed therein. Where the loop is formed by a sheet, the ends of the sheet may be butt spliced together. The splice may be located at the inner ring or outer ring of the non-pneumatic tire. Where the loop is formed by a spiraled ribbon, the butt splice may be omitted.

In both instances, the reinforcement may be steel cords. In other embodiments, the reinforcement may be formed by cords constructed of nylon, polyester, fiber glass, carbon fiber, aramid, glass, polyethylene (polyethylene terephthalate), or other reinforcement materials. In an alternative embodiment, the loops may be constructed of elastomeric material having two or more layers of reinforcements.

The tread 140 and the fillets 150 are both constructed of an elastomeric material, such as natural or synthetic rubber, other elastomeric material.

Figure 3:
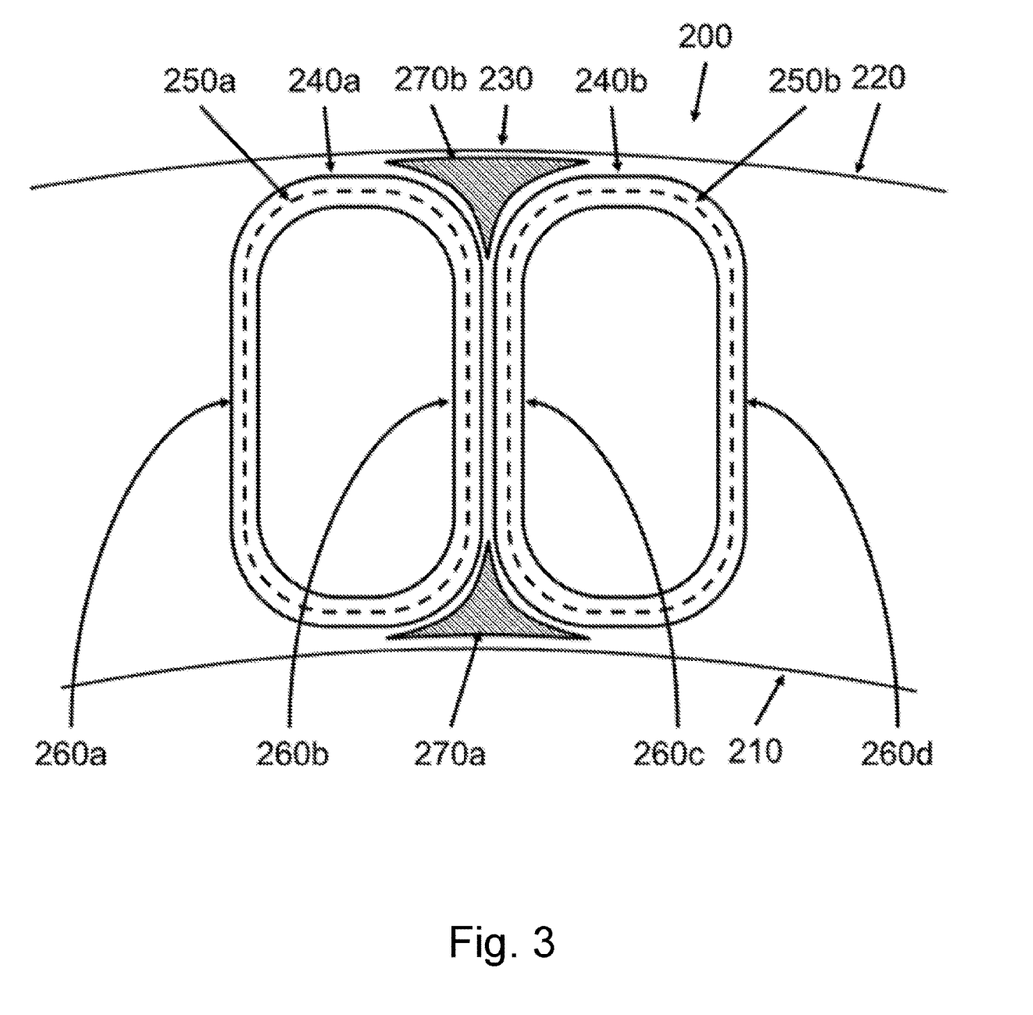
FIG. 3 is a schematic drawing illustrating a partial front view of a non-pneumatic tire during its construction.

Additional details of the loops may be seen in FIG. 3, which is a schematic drawing illustrating a partial front view of a non-pneumatic tire 200 during its construction. The non-pneumatic tire 200 includes an inner ring 210 having a first diameter, and an outer ring 220 having a second diameter greater than the first diameter. The outer ring 220 is substantially coaxial with the inner ring 210. As shown in this figure, a spoke 230 is being formed by a first loop 240a and a second loop 240b. The first loop includes a first layer of reinforcement cords 250a, and the first loop forms a first substantially radial extent 260a and a second substantially radial extent 260b. The second loop includes a second layer of reinforcement cords 250b, and the second loop forms a third substantially radial extent 260c and a fourth substantially radial extent 260d.

Additionally, a first fillet 270a is disposed between the first loop 240a, the second loop 240b, and the inner ring 210. A second fillet 270b is likewise disposed between the first loop 240a, the second loop 240b, and the outer ring 220.

At the stage shown in FIG. 3, the first loop 240a is spaced from the second loop 240b. This spacing may be exaggerated for illustrative purposes. During the process of forming the non-pneumatic tire, heat and pressure are applied during a curing process. Specifically, pressure is applied to the second extent 260b of the first loop 240a and to the third extent 260c of the second loop 240b, which causes the second extent 260b to contact the third extent 260c. As heat and pressure are applied, the second extent 260b bonds with the third extent 260c, such that the first loop 240a and the second loop 240b form a single spoke 230 having two layers of reinforcement cords formed by the first and second layer of reinforcement cords 250a,b. The resulting spoke 230 extends in a substantially radial direction, in the same manner as the spokes 130 of FIGS. 1 and 2.

In one embodiment, at least half of the second extent 260b is in contact with at least half of the third extent 260c. In an alternative embodiment, at least two-thirds of the second extent 260b is in contact with at least two-thirds of the third extent 260c.

In the illustrated embodiment, each of the first and second layers of reinforcement cords 250a,b extends in a substantially radial direction in the resulting spoke 130. In an alternative embodiment, one or both of the layers of reinforcement cords is biased with respect to the radial direction. In one such embodiment, one or both of the layers of reinforcement cords is biased at an angle between 50° and 90°. In such an embodiment, a butt splice may also be angled.

In an alternative embodiment, the extents between the inner and outer ring are curved rather than linear. Curved extents may be used to control the direction and the magnitude of spoke buckling as the tire rotates. Such curved extents may still be considered substantially radial. In one such embodiment, the reinforcement cords may have the same curve as the extents. In an alternative embodiment, the reinforcement cords may have different curves from the extents. In another alternative embodiment, the reinforcement cords may extend linearly while the extents are curved.

In other alternative embodiments, the extents are substantially linear while one or more of the layers of reinforcement cords are curved with respect to radial direction. Curved layers of reinforcement cords may be used to control the direction and the magnitude of spoke buckling as the tire rotates. In such embodiments, the resulting spoke may still extend linearly when in an uncompressed state, even though one or more of the layers of reinforcement cords are curved. In such an arrangement, the spokes may be described as having a reinforcement pre-curvature.

Figure 4:
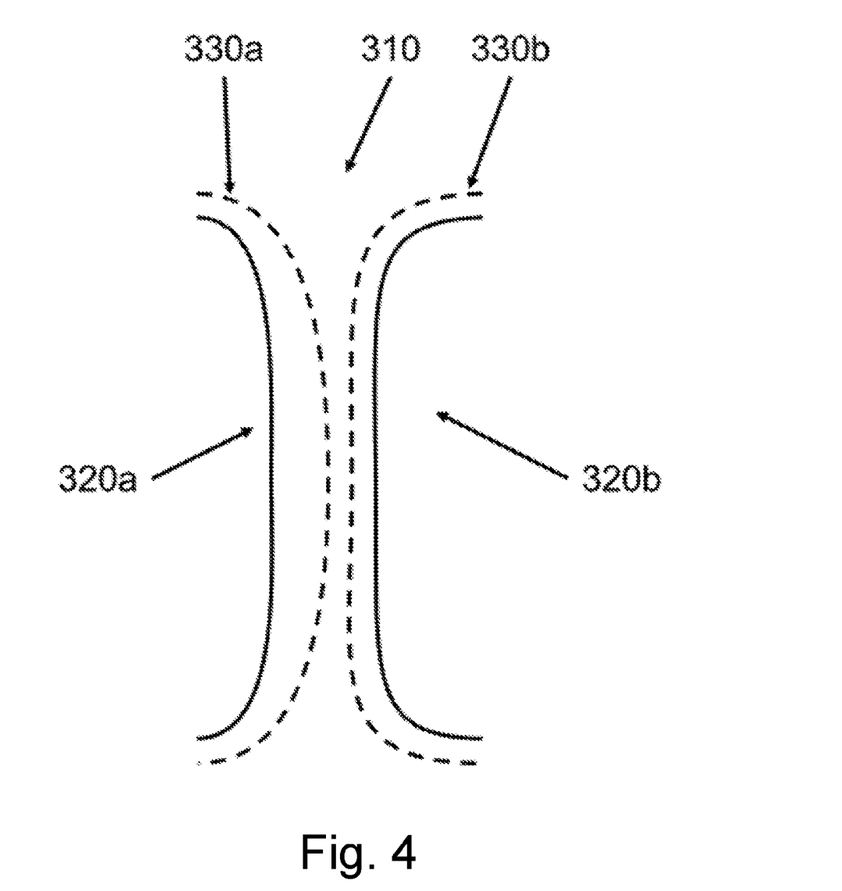
FIG. 4 is a schematic drawing illustrating a partial front view of an alternative embodiment of a spoke for a non-pneumatic tire.

FIG. 4 provides an example of a spoke having a reinforcement pre-curvature. FIG. 4 is a schematic drawing illustrating a partial front view of an alternative embodiment of a non-pneumatic tire 300. A spoke 310 is defined by a first loop 320a having a first layer of reinforcement cords 330a and a second loop 320b having a second layer of reinforcement cords 330b. The spoke 310 extends in a substantially radial direction. The second layer of reinforcement cords 330b also extends in a substantially radial direction along the length of the spoke 310, but the first layer of reinforcement cords 330a is curved inside of the spoke 310.

In the illustrated embodiment, the first layer of reinforcement cords 330a is curved while the second layer of reinforcement cords is substantially linear. In an alternative embodiment, both the first and second layers of reinforcement cords are curved.

Figure 5A:
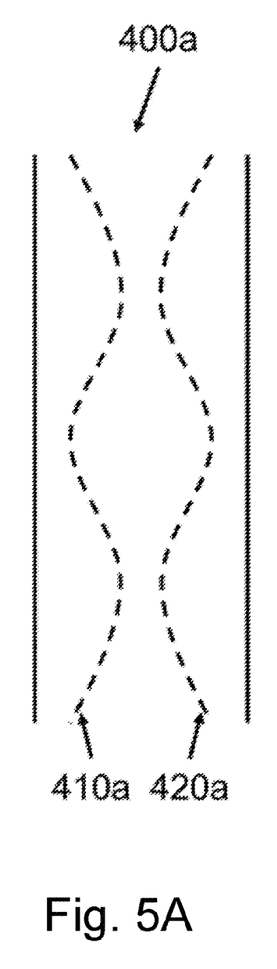
FIGS. 5A-5C are schematic drawings illustrating a partial front views of other alternative embodiments of spokes for non-pneumatic tires.
Figure 5B:
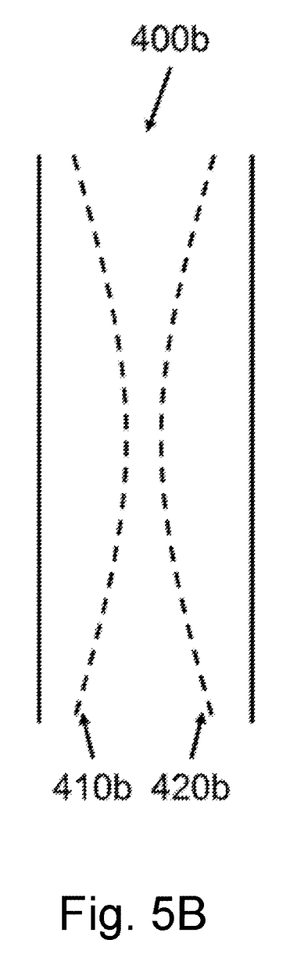
Figure 5C:
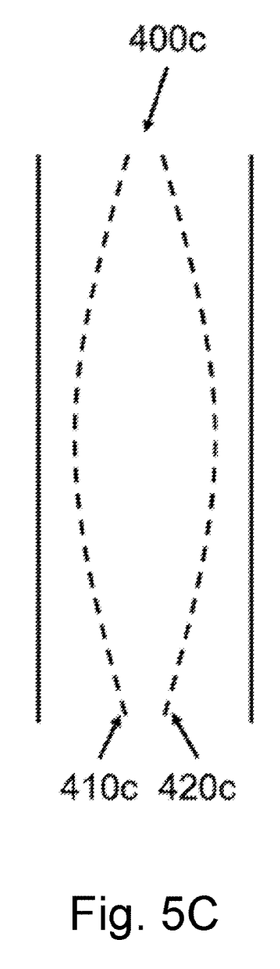

FIGS. 5A-5C are schematic drawings illustrating a partial front views of other alternative embodiments of spokes 400a-c for non-pneumatic tires. In FIG. 5A, the spoke 400a includes a first layer of reinforcement cords 410a and a second layer of reinforcement cords 420a. Each of the layers of reinforcement cords 410a, 420a has multiple curves along the length of the spoke 400a, and may thus be described as wavy. In the illustrated embodiment, the layers of reinforcement cords 410a, 420a are curved in opposite directions, such that the peaks of the first layer of reinforcement cords 410a correspond with the peaks of the second layer of reinforcement cords 420a. In alternative embodiments (not shown), the curves of the layers of reinforcement cords may be offset, or the layers of reinforcement cords may be curved such that they have waves of differing periodicity.

In FIG. 5B, the spoke 400b includes a first layer of reinforcement cords 410b and a second layer of reinforcement cords 420b. Each of the layers of reinforcement cords 410b, 420b has a single curve along the length of the spoke 400ab. In the illustrated embodiment, the layers of reinforcement cords 410b, 420b are curved in opposite directions such that they form a biconcave shape. In an alternative embodiment (not shown) the layer of reinforcement cords may be curved in the same direction or have offset curves.

In FIG. 5C, the spoke 400c includes a first layer of reinforcement cords 410c and a second layer of reinforcement cords 420c. Each of the layers of reinforcement cords 410c, 420c has a single curve along the length of the spoke 400c. In the illustrated embodiment, the layers of reinforcement cords 410c, 420c are curved in opposite directions such that they form a biconvex shape, or an ogive shape. In an alternative embodiment (not shown) the layers of reinforcement cords may be curved in the same direction or have offset curves.

Figure 6:
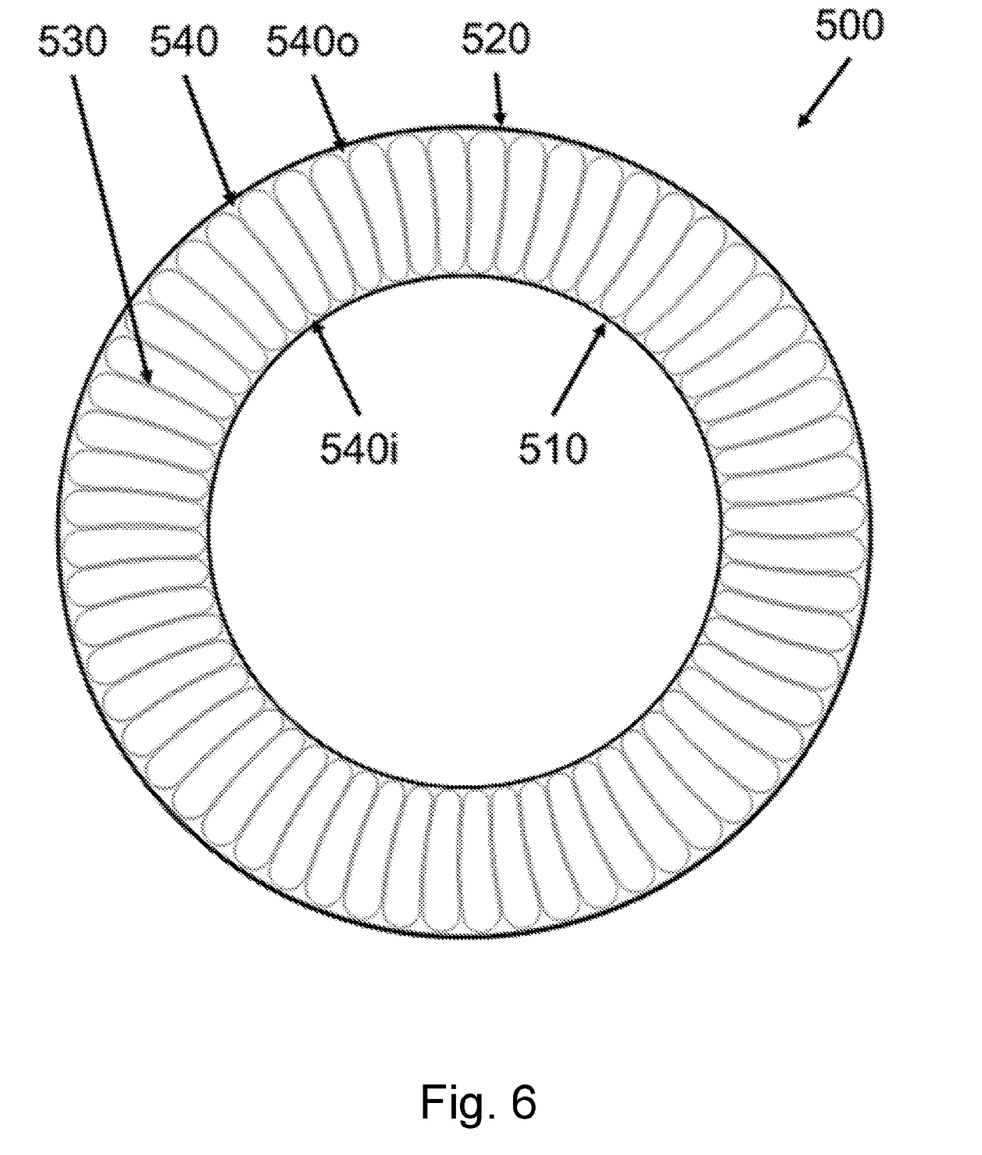
FIG. 6 is a front view of yet another alternative embodiment of a non-pneumatic tire.

In alternative embodiments, the spokes themselves may be curved. For example, FIG. 6 is a front view of yet another alternative embodiment of a non-pneumatic tire 500. The non-pneumatic tire 500 includes an inner ring 510 having a first diameter, and an outer ring 520 having a second diameter greater than the first diameter. The outer ring 520 is substantially coaxial with the inner ring 510. A plurality of spokes 530 extend between the inner ring 510 and the outer ring 520. In an alternative embodiment, a webbing or other support structure may be employed instead of spokes. A circumferential tread (not shown in this figure) may be disposed about the outer ring 520. The non-pneumatic tire 500 is substantially the same as the non-pneumatic tire 100 except for the differences described herein. Like materials may be used for like components.

The spokes 530 are formed by a plurality of loops disposed circumferentially about the non-pneumatic tire 500. Each individual loop extends laterally from a first side of the non-pneumatic tire 500 to second side of the non-pneumatic tire 500. Each of the plurality of loops defines an opening that is visible from the first side of the tire. In this embodiment, the loops are kidney-shaped, and thus form curved spokes 530. In alternative embodiments (not shown), the loops may have other curvatures. For example, the loops may be circular or oval.

In the illustrated embodiment, each of the plurality of loops is in direct contact with both the inner ring 510 and the outer ring 520. A plurality of fillets 540 are also disposed between the inner ring 510 and the outer ring 520. The plurality of fillets 540 includes inner fillets 540i and outer fillets 540o. The inner fillets 540i are in direct contact with the inner ring 510, and both a first loop and a second loop in each adjacent pair of loops. The outer fillets 540o are in direct contact with the outer ring 520, and both the first loop and second loop in each adjacent pair of loops.

Figure 7:
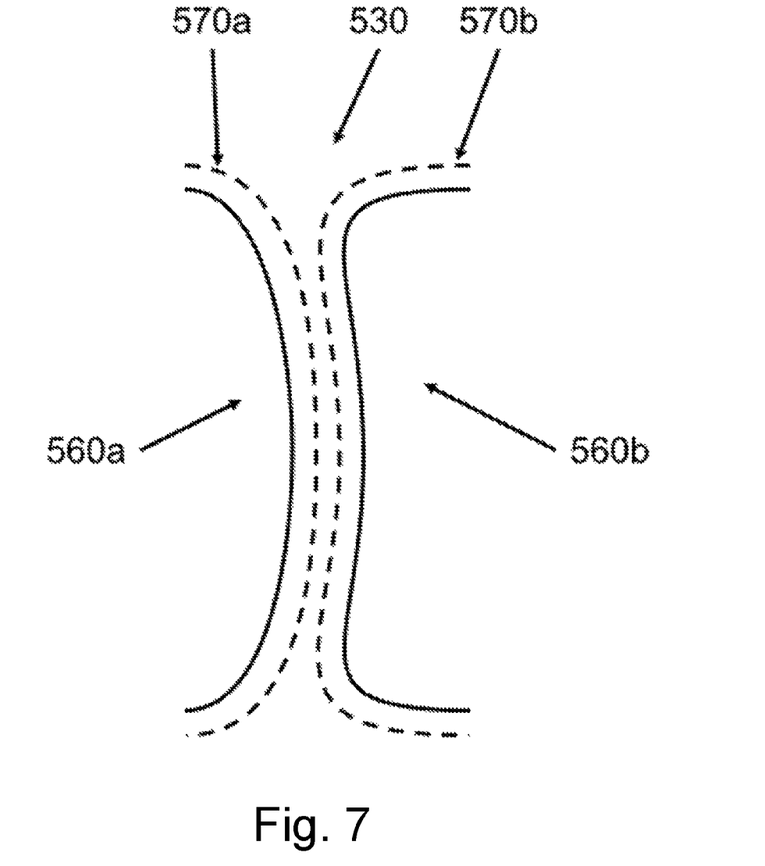
FIG. 7 is a schematic drawing illustrating a partial front view of a spoke of the non-pneumatic tire of FIG. 6.

FIG. 7 is a schematic drawing illustrating a partial front view of a spoke 530 of the non-pneumatic tire 500 of FIG. 6. As shown in this figure, the spoke 530 is formed by a first loop 560a and a second loop 560b. The first loop includes a first layer of reinforcement cords 570a. The second loop includes a second layer of reinforcement cords 570b. Each of the loops has a pair of curved extents that extend between the inner ring and the outer ring and that are in contact with the curved extents of adjacent loops, thereby forming the spokes 530. In the illustrated embodiment, the curved extents of each loop are substantially parallel to each other. In an alternative embodiment (not shown), each pair of the adjacent curved extents are curved in opposite directions. Such an arrangement would be present in circular or oval loops.

In one embodiment, at least half of the curved extent of the first loop 560a is in contact with at least half of the curved extent of the second loop 560b. In an alternative embodiment, at least two-thirds of the curved extent of the first loop 560a is in contact with at least two-thirds of the curved extent of the second loop 560b.

In the illustrated embodiment, the first and second layers of reinforcement cords 570a,b are curved in the same manner as the extents of the loops 560a,b. In an alternative embodiment (not shown), one or more of the layers of reinforcement cords may be straight. In other alternative embodiments (not shown), the layers of reinforcement cords may be curved in different manners, similar to the curves shown in FIGS. 4 and 5A-C.

To build a non-pneumatic tire, such as the non-pneumatic tire 100, 200, 300, 500, an operator may perform the steps of providing an inner ring of elastomeric material, providing an outer ring of elastomeric material, and arranging the inner ring and the outer ring such that the inner ring is substantially coaxial with the outer ring. In one embodiment, the operator provides sheets of reinforced elastomeric material, and forms a plurality of loops with the sheets of reinforced elastomeric material. Each loop may be formed by butt splicing the ends of the sheet together. The operator then places the loops of reinforced elastomeric material between the inner ring and the outer ring. The loops may be arranged such that the butt splice is tangential to either the inner ring of the outer ring.

In another embodiment, the operator provides a ribbon of reinforced elastomeric material. In one particular embodiment, the operator forms a ribbon by extruding a ribbon of green rubber with exactly two steel cords, thus forming a green rubber ribbon with two steel cords embedded therein.

In yet another embodiment, the operator forms a ribbon by extruding a ribbon of green rubber with one steel cord. In still another embodiment, the operator forms a ribbon by extruding a ribbon of green rubber with three or more steel cords.

In an alternative embodiment, the ribbons may be made by a calendering operation rather than an extruding operation. For example, in one embodiment, the ribbons are made by calendering rubber over cords and the slitting the calendered sheet into thin ribbons containing one, two, or more cords.

Figure 8:
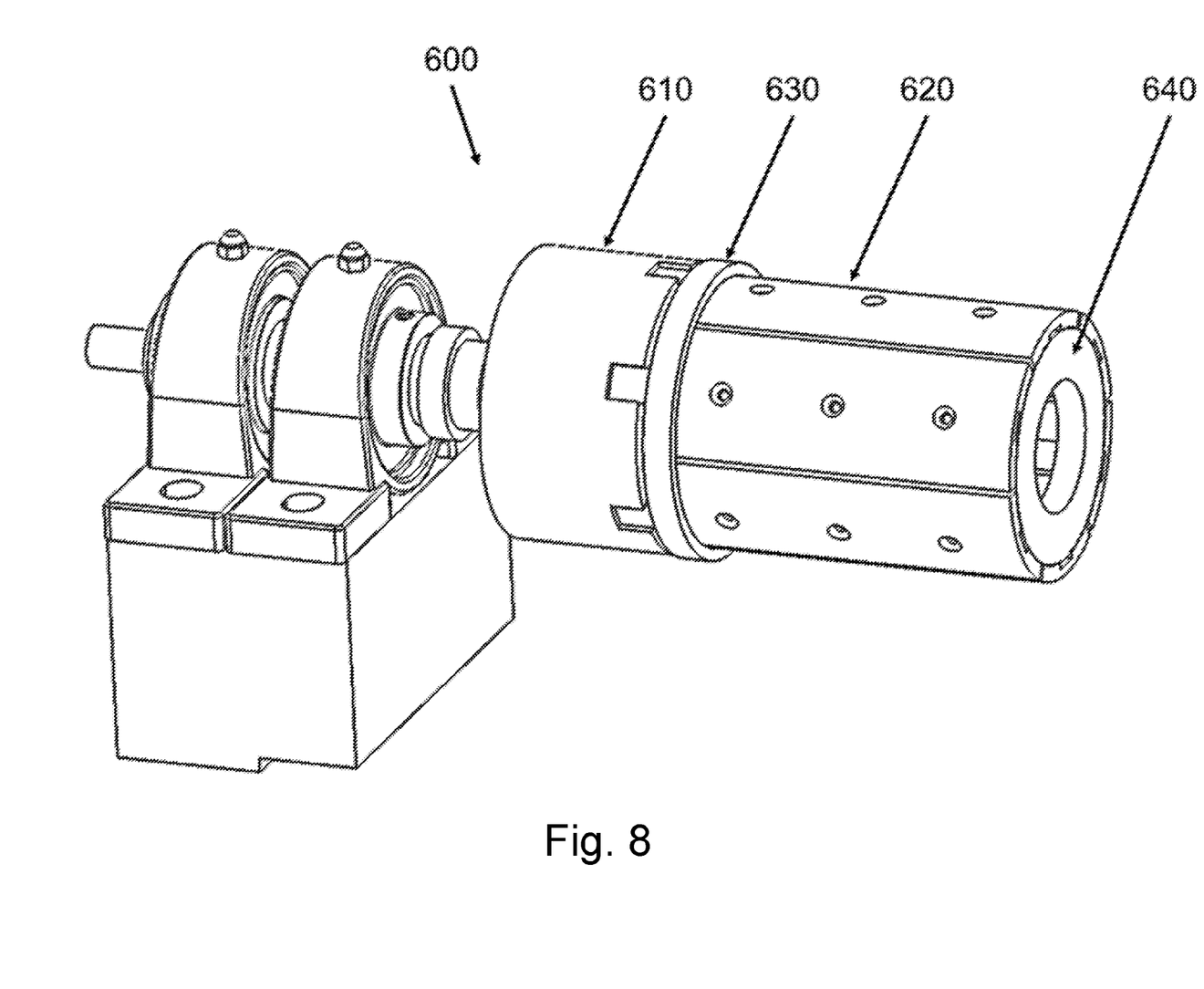
FIG. 8 is a perspective view of one embodiment of a collapsible chuck for winding a ribbon.

In the ribbon embodiments, the operator provides a plurality of cores and spirally winds the ribbon of reinforced elastomeric material about each of the plurality of cores. In one such embodiment, the operator employs a collapsible chuck for winding a ribbon. FIG. 8 is a perspective view of one embodiment of a collapsible chuck 600. The use of the collapsible chuck 600 permits removal of the ribbon of reinforced elastomeric material. An end stop 640 and an outer ring 630 are used to control the diameter of a winding mandrel. These components may be changed to vary the inner diameter of the loop.

The collapsible chuck 600 includes a lathe chuck 610 and jaw extensions 620 that form a collapsible winding mandrel. In an alternative embodiment (not shown) a gang of collapsible mandrels may be mounted in a winding machine directly at the end of a cord extruder. Such a machine could have multiple heads allowing the simultaneous production of more than one loop.

The machine on which the collapsible chuck 600 is mounted provides rotational and transverse control of the position of the collapsible winding mandrel. The ratio between rotational and translational speed controls the spacing of the ribbon. This ratio is used to control the final endcount of the ribbon.

After the ribbon of reinforced elastomeric material is wrapped about the collapsible winding mandrel of the collapsible chuck 600, it is transferred to a core.

Figure 9:
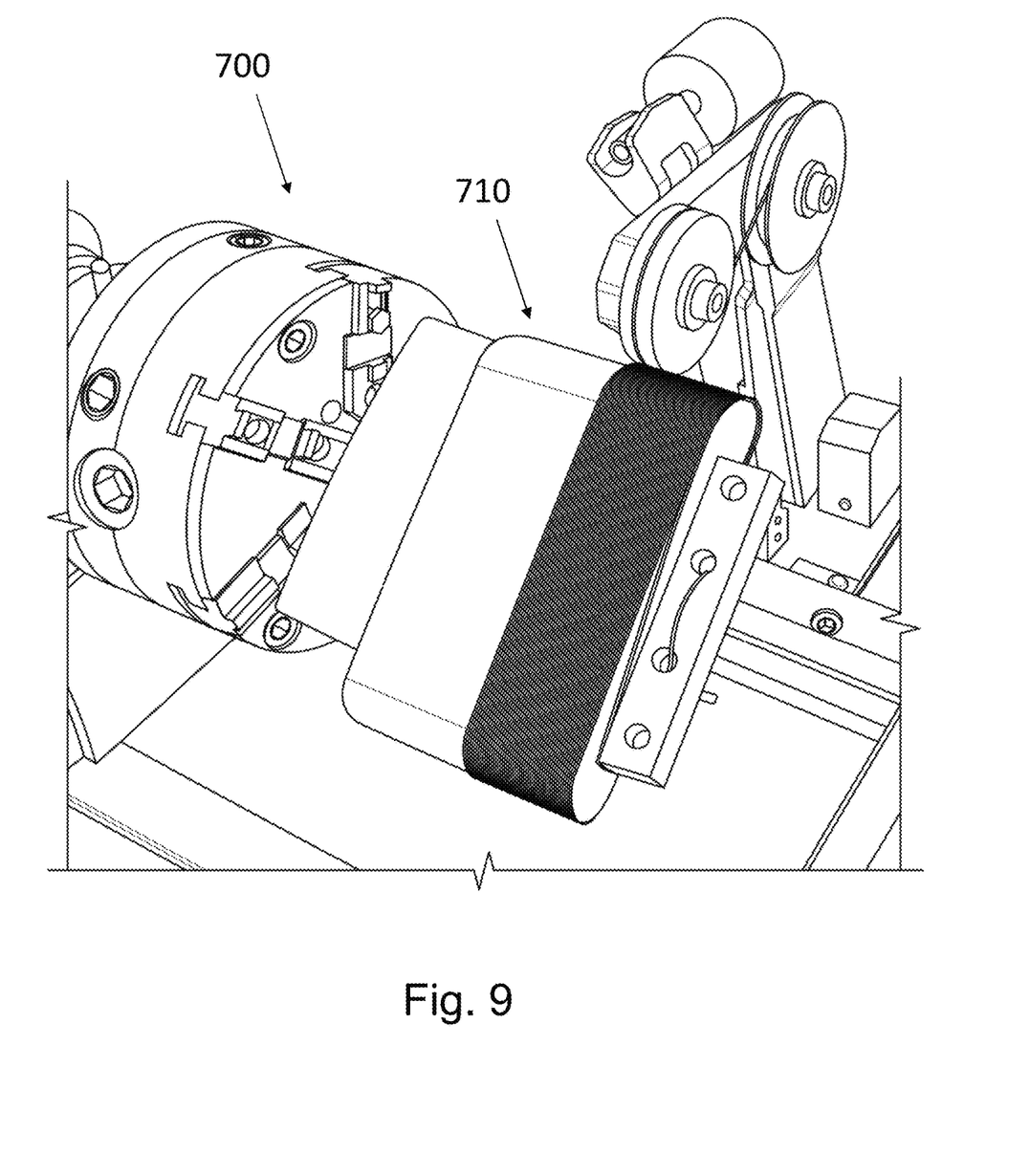
FIG. 9 is a front view of one embodiment of a collapsible chuck with a collapsible winding mandrel having a ribbon wound thereon.

FIG. 9 is a front view of an alternative embodiment of a collapsible chuck 700 with a core 710 directly inserted into grips of a collapsible chuck. In such an embodiment, the ribbon of reinforced elastomeric material is wound directly onto the core. The core is subsequently removed from collapsible chuck.

After the ribbon of reinforced elastomeric material is wound about at least one of the cores, the operator arranges the plurality of cores between the inner ring and the outer ring. The cores are arranged such that the spirally wound ribbon of one of the plurality of cores contacts the spirally wound ribbon of an adjacent one of the plurality of cores.

Figure 10:
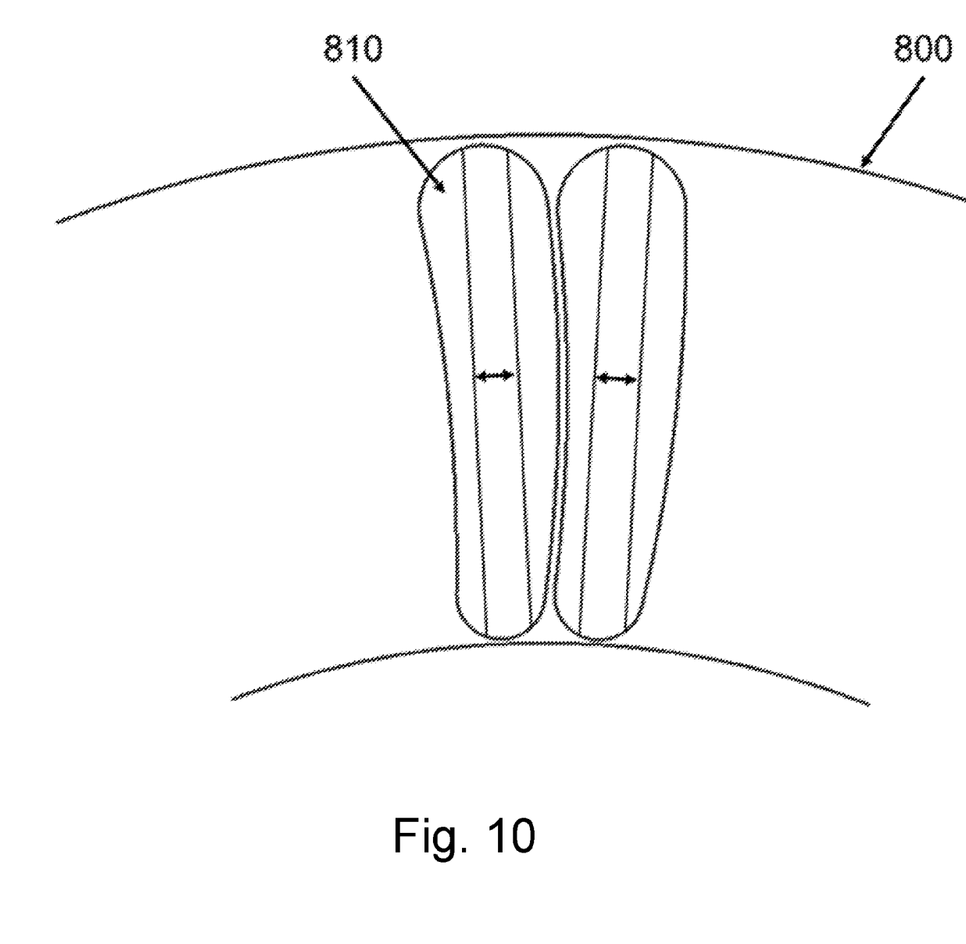
FIG. 10 is a partial front view of one embodiment of a green tire having cores with a ribbon of elastomeric material disposed thereon, with the cores expanding in a first direction.

In one embodiment, the cores are expandable cores. FIG. 10 is a partial front view of one embodiment of a green tire 800 having cores 810 with a ribbon of reinforced elastomeric material disposed thereon, with the cores 810 expanding in a first direction so that the reinforced elastomeric material of adjacent cores 810 come into contact.

Figure 11:
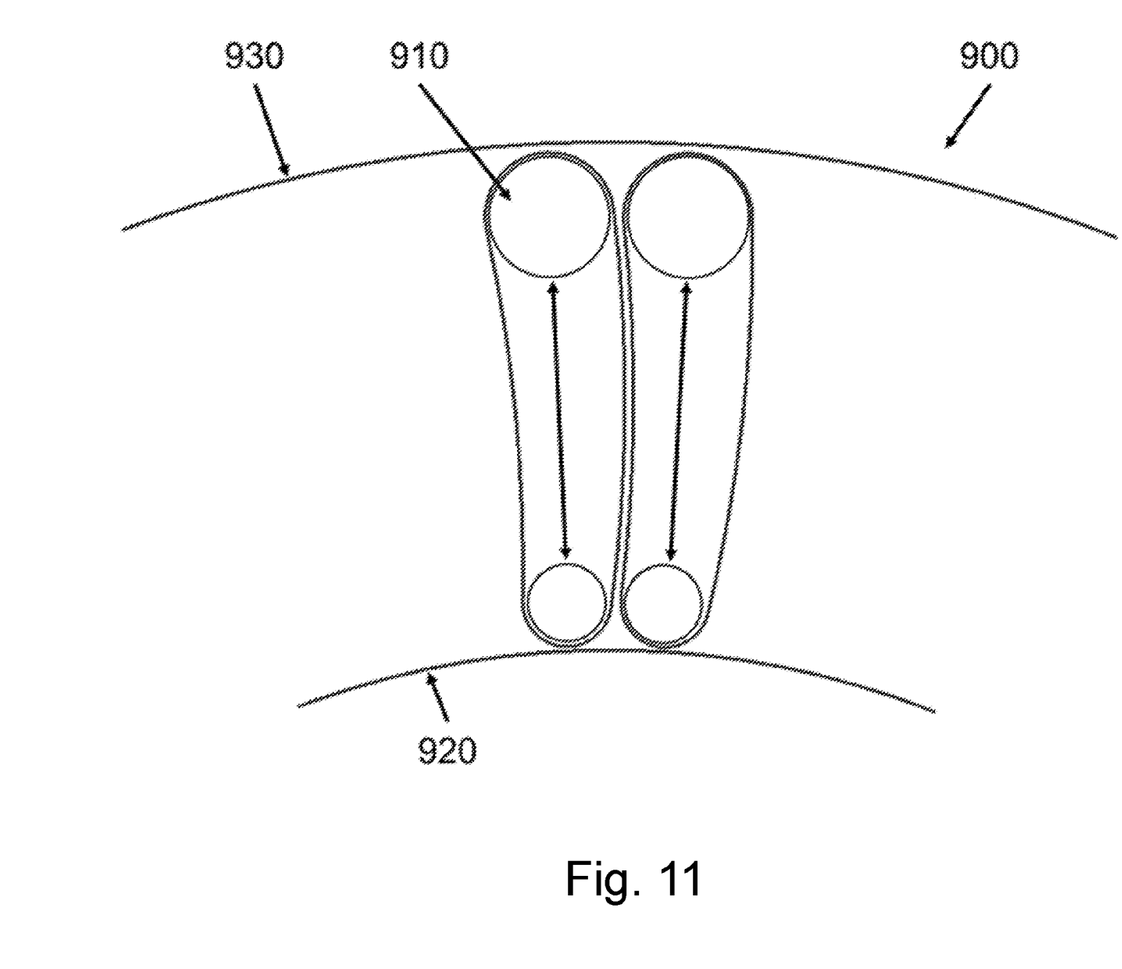
FIG. 11 is a partial front view of one embodiment of a green tire having cores with a ribbon of elastomeric material disposed thereon, with the cores expanding in a second direction.

FIG. 11 is a partial front view of one embodiment of a green tire 900 having cores 910 with a ribbon of elastomeric material disposed thereon, with the cores 910 expanding in a second direction so that the ribbon of reinforced elastomeric material of the cores 910 comes into contact with an inner ring 920 and an outer ring 930.

The operator then places a plurality of fillets between the cores, the inner ring, and outer ring. The operator then cures the inner ring, the outer ring, the plurality of fillets, and the ribbon disposed about the plurality of cores to form a cured tire.

In one embodiment, the tire is cured in multiple stages, using multiple sets of cores. For example, the operator may first wind the ribbon of reinforced elastomeric material about a first set of cores, such as the cores 800 shown in FIG. 10, and expands the cores 800 so that the ribbons of reinforced elastomeric material come into contact with each other. The operator then performs a first curing, such that the ribbons of reinforced elastomeric material of each of the cores are partially cured together.

The operator may then transfer the partially cured ribbons of reinforced elastomeric material to a second set of cores, such as the cores 900 shown in FIG. 11. The operator may then place the second set of cores 900 between an inner ring and an outer ring, and expand the cores 900 such that the partially cured ribbons of reinforced elastomeric material come into contact with the inner ring 920 and the outer ring 930. The operator then performs a second curing, such that the ribbons of reinforced elastomeric material of each of the cores are fully cured together and to the inner ring and outer ring.

In one such embodiment, the fillets are placed between the cores before the first curing. In an alternative embodiment, the fillets are placed between the cores, the inner ring, and the outer ring after the first curing but before the second curing. In yet another alternative embodiment, the fillets are placed between the cores, the inner ring, and the outer ring after the second curing but before a third curing.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
    an inner ring having a first diameter;
    an outer ring having a second diameter greater than the first diameter, the outer ring being substantially coaxial with the inner ring;
    support structure extending between the inner ring and the outer ring, the support structure including a plurality of loops extending laterally from a first side of the non-pneumatic tire to second side of the non-pneumatic tire,
        wherein each of the plurality of loops defines an opening that is visible from the first side of the non-pneumatic tire,
        wherein each of the plurality of loops is formed by a spiraled ribbon of elastomeric material having a single layer of reinforcement disposed therein,
        wherein each of the plurality of loops is in direct contact with both the inner ring and the outer ring,
        wherein the plurality of loops includes at least a first loop and a second loop, the first loop being in direct contact with the second loop; and
    a plurality of fillets disposed between the inner ring and the outer ring, the plurality of fillets including at least a first fillet and a second fillet,
        wherein the first fillet is in direct contact with the inner ring, the first loop, and the second loop, and wherein the second fillet is in direct contact with the outer ring, the first loop, and the second loop.

2. The non-pneumatic tire of claim 1, wherein each of the plurality of loops is formed by a sheet of elastomeric material having a single layer of reinforcement disposed therein.

3. The non-pneumatic tire of claim 1, wherein the single layer of reinforcement is formed by at least one cord of reinforcement material embedded in the spiraled ribbon of elastomeric material.

4. The non-pneumatic tire of claim 3, wherein the spiraled ribbon of elastomeric material includes exactly two steel cords embedded therein.

5. The non-pneumatic tire of claim 1, wherein the first loop includes a first extent and a second extent extending between the inner ring and the outer ring, wherein the second loop includes a third extent and a fourth extent extending between the inner ring and the outer ring, and wherein the second extent contacts the third extent.

6. The non-pneumatic tire of claim 5, wherein each of the first extent, the second extent, the third extent, and the fourth extent are curved.

7. The non-pneumatic tire of claim 5, wherein the first extent is a first substantially radial extent that includes a first reinforcement layer extending in a substantially radial direction, and wherein the second extent is a second substantially radial extent that includes a second reinforcement layer that is curved with respect to the radial direction.

8. A non-pneumatic tire comprising:
an inner ring;
an outer ring;
a plurality of loops extending between the inner ring and the outer ring, the plurality of loops including at least a first loop and a second loop,
wherein the first loop is in direct contact with both the inner ring and the outer ring,
wherein the first loop is formed by a spiraled ribbon of elastomeric material having a single reinforcement layer disposed therein,
wherein the first loop includes a first extent that extends between the inner ring and the outer ring and a second extent that extends between the inner ring and the outer ring,
wherein the second loop is in direct contact with both the inner ring and the outer ring,
wherein the second loop is formed by a spiraled ribbon of elastomeric material having a single reinforcement layer disposed therein,
wherein the second loop includes a third extent that extends between the inner ring and the outer ring and a fourth extent that extends between the inner ring and the outer ring, and
wherein the second extent is in direct contact with the third extent.

9. The non-pneumatic tire of claim 8, further comprising a plurality of fillets disposed between the inner ring and the outer ring,
wherein the plurality of fillets includes at least a first fillet in contact with the inner ring, the first loop, and the second loop, and
wherein the plurality of fillets includes at least a second fillet in contact with the outer ring, the first loop, and the second loop.

10. The non-pneumatic tire of claim 8, wherein each of the first extent, the second extent, the third extent, and the fourth extent extends substantially linearly in a radial direction.

11. The non-pneumatic tire of claim 8, wherein the first extent is curved in a first direction and the second extent is curved in a second direction, and wherein the first direction is substantially parallel to the second direction.

12. The non-pneumatic tire of claim 11, wherein the single reinforcement layer of the first loop in the first extent is curved in the first direction and the single reinforcement layer of the first loop in the second extent is curved in the second direction substantially parallel the first direction.

13. A method of making a non-pneumatic tire, the method comprising:
providing an inner ring of elastomeric material;
providing an outer ring of elastomeric material;
arranging the inner ring and the outer ring such that the inner ring is substantially coaxial with the outer ring;
providing a ribbon of reinforced elastomeric material;
providing a plurality of cores;
spirally winding the ribbon of reinforced elastomeric material about each of the plurality of cores;
arranging the plurality of cores between the inner ring and the outer ring; and
curing the inner ring, the outer ring, and the ribbon disposed about the plurality of cores.

14. The method of claim 13, wherein the providing of the ribbon of reinforced elastomeric material includes extruding at least one steel cord and an elastomeric material through an extruder to form the ribbon of reinforced elastomeric material.

15. The method of claim 13, wherein the spirally winding of the ribbon of reinforced elastomeric material about each of the plurality of cores includes spirally winding the ribbon of reinforced elastomeric material about a mandrel, and transferring the ribbon of reinforced elastomeric material from the mandrel to one of the plurality of cores.

16. The method of claim 13, wherein the spirally winding of the ribbon of reinforced elastomeric material about each of the plurality of cores includes spirally winding the ribbon of reinforced elastomeric material directly about each of the plurality of cores.

17. The method of claim 13, wherein the arranging of the plurality of cores between the inner ring and the outer ring includes arranging the plurality of cores such that the spirally wound ribbon of one of the plurality of cores contacts the spirally wound ribbon of an adjacent one of the plurality of cores.

18. The method of claim 13, further comprising expanding each of the plurality of cores prior to the curing of the inner ring, the outer ring, and the ribbon disposed about the plurality of cores.

19. The method of claim 13, further comprising inserting a plurality of fillets between adjacent cores.

* * * * *